(12) United States Patent
Caldwell et al.

(10) Patent No.: US 7,400,385 B2
(45) Date of Patent: Jul. 15, 2008

(54) OPTICAL AIR DATA SYSTEMS AND METHODS

(75) Inventors: Loren M. Caldwell, Ft. Collins, CO (US); Martin J. O'Brien, Pine, CO (US); Carl S. Weimer, Littleton, CO (US); Loren D. Nelson, Evergreen, CO (US)

(73) Assignee: Ophir Corporation, Littleton, CO (US)

( * ) Notice: Subject to any disclaimer, the term of this patent is extended or adjusted under 35 U.S.C. 154(b) by 277 days.

(21) Appl. No.: 11/103,020

(22) Filed: Apr. 11, 2005

(65) Prior Publication Data

US 2005/0248748 A1  Nov. 10, 2005

Related U.S. Application Data

(63) Continuation of application No. 10/632,735, filed on Aug. 1, 2003, now Pat. No. 6,894,768.

(60) Provisional application No. 60/400,462, filed on Aug. 2, 2002.

(51) Int. Cl.
*G01P 3/36* (2006.01)
*G01N 21/00* (2006.01)

(52) U.S. Cl. .................................. 356/28; 356/342
(58) Field of Classification Search .................. 356/28, 356/28.5, 337, 342
See application file for complete search history.

(56) References Cited

U.S. PATENT DOCUMENTS 5,394,238 A * 2/1995 Mocker et al. ............... 356/342
5,835,252 A * 11/1998 Meier et al. ................. 359/201
6,307,626 B1 * 10/2001 Miles et al. ................. 356/301
6,512,996 B1 * 1/2003 Praskovsky et al. .......... 702/189
7,106,447 B2 * 9/2006 Hays ............................ 356/450

FOREIGN PATENT DOCUMENTS

WO   9935519 A2   7/1999
WO   2004077067   9/2004

OTHER PUBLICATIONS

Yalin et al "Ultraviolet filtered Rayleigh scattering temperature measurements with a mercury filter"; May 1, 1999; Optics Letters, vol. 24, No. 9, pp. 590-529.*

Office Action dated Jun. 24, 2004 in related U.S. Appl. No. 10/632,735.

(Continued)

*Primary Examiner*—Isam Alsomiri
(74) *Attorney, Agent, or Firm*—Lathrop & Cage LC

(57) ABSTRACT

Systems and methods for sensing air outside a moving aircraft are presented. In one embodiment, a system includes a laser for generating laser energy. The system also includes one or more transceivers for projecting the laser energy as laser radiation to the air. Subsequently, each transceiver receives laser energy as it is backscattered from the air. A computer processes signals from the transceivers to distinguish molecular scattered laser radiation from aerosol scattered laser radiation and determines one or more air parameters based on the scattered laser radiation. Such air parameters may include air speed, air pressure, air temperature and aircraft orientation angle, such as yaw, angle of attack and sideslip.

9 Claims, 11 Drawing Sheets

OTHER PUBLICATIONS

Response to Office Action dated Jun. 24, 2004 in related U.S. Appl. No. 10/632,735, filed Nov. 12, 2004.
Notice of Allowance dated Jan. 19, 2005 in related U.S. Appl. No. 10/632,735.
109 and 110 Communication dated Mar. 14, 2005 in related European Patent Application Serial No. 03749002.
Response to 109 and 110 Communication dated Mar. 14, 2005 in related European Patent Application Serial No. 03749002 filed Apr. 13, 2005.
Examination Report dated Mar. 2, 2006 in related European Patent Application Serial No. 03749002.
Response to Examination Report dated Mar. 2, 2006, in related European Patent Application Serial No. 03749002 filed Aug. 25, 2006.
Decision to Grant European Patent dated Apr. 5, 2007 in related European Patent Application Serial No. 03749002.
International Search Report dated Mar. 17, 2004 in related PCT Patent Application Serial No. PCT/US03/24191.
Grinstead, J.H., et al "Frequency-Modulated Filtered Rayleigh Scattering (FM-FRS): A New Technique For Real-Time Velocimetry" paper 96-0302, American Institute of Aeronautics And Astronautics, Inc., pp. 1-11, 1996.

* cited by examiner

OPTICAL AIR DATA SYSTEMS AND METHODS

RELATED APPLICATIONS

This application is a continuation and claims benefit of priority to commonly-owned and U.S. patent application Ser. No. 10/632,735, filed 1 Aug. 2003, now U.S. Pat. No. 6,894,768 which claims benefit of priority to U.S. Provisional Patent Application No. 60/400,462, filed Aug. 2, 2002. Both of the above-mentioned applications are incorporated herein by reference.

U.S. GOVERNMENT RIGHTS

This invention was made in part with the support of the U.S. Government; the U.S. Government has certain rights in this invention as provided for by the terms of Grant # NAS4-0243 awarded by the NASA Dryden Flight Research Center.

BACKGROUND

An Air Data System ("ADS") provides sensed telemetry informing pilots, navigators or Vehicle Management System computers of air parameter(s) affecting aircraft stability. These air parameters include, for example, air speed, air temperature and air pressure, each being useful for navigation and flight control. The ADS exists in many forms, for example, as mechanical, opto-mechanical or opto-electronic devices.

One mechanical ADS includes a Pitot tube, which affixes to the exterior of the aircraft. The Pitot tube is a pneumatic measuring instrument that receives air external to the aircraft and determines air speed based upon air pressure. A typical Pitot tube uses a pressure transducer to measure the pressure of air received through a plurality of holes. Determined air pressure is combined with air density measurements and air temperature measurements using the well-known Bernoulli equation to calculate air speed. Pilots and Vehicle Management Systems use this information for decisions regarding aircraft stability, flight control and navigation.

The prior art ADS has limitations. With respect to the Pitot tube, for example, if aircraft velocity is too low, the pressure transducer may lack requisite sensitivity to provide meaningful telemetry data, such that transducer signal noise or error may be greater than meaningful differences in pressure measurement. Alternatively, if the velocity is very high (e.g., supersonic), certain assumptions, such as those regarding incompressibility of air flow in Bernoulli's equation, are violated and the measurement is incorrect. Accordingly, Bernoulli's equation must be altered to compensate for various breached assumptions. This compensation process must continue in rapidly changing conditions of altitude and air density. It is, therefore, desirable to improve accuracy and operability of the ADS.

One improvement is an Optical Air Data System ("OADS"), which uses light to determine parameters of air speed. The OADS transmits light pulses into the atmosphere and receives light that is reflected, or "backscattered", from aerosols towards the aircraft. Aerosols are fine solids and/or liquid particles suspended in air or other gases.

The OADS may also measure the Doppler effect, receiving the backscattered light and measuring return frequency to determine speed. However, the prior art OADS relies on scattered light that is unpredictable because of varying aerosol distributions. For example, aerosol distribution varies significantly with altitude and cloud content. In addition, some regions of the atmosphere contain too few aerosols to enable reliable air data measurements. Thus, aerosol-based optical air data systems cannot determine the air speed at all altitudes frequented by modern aircraft. Finally, an OADS that relies solely on aerosol scattering cannot determine air temperature or air pressure. Air temperature and pressure are critical air data parameters for determining air density and Mach number. Hence, there is a need to improve optical air data systems and methods.

SUMMARY OF THE INVENTION

In one embodiment, an Optical Air Data System ("OADS") advances the art and overcomes the problems mentioned above by determining air parameters (air speed, air temperature and air pressure) based upon laser energy that is backscattered from both air molecules and aerosols. In one example, the OADS projects laser energy to the air and receives backscattered laser energy from the air molecules and/or aerosols. The OADS converts such backscattered laser energy to electronic signals which are processed to determine desired air parameters. Such air parameters may include, for example, air speed, air temperature and air pressure, among others, and provide telemetry for air vehicle flight control and navigation.

In one embodiment, the OADS includes at least one laser configured for generating laser energy. The OADS also includes one or more transceivers configured for projecting the laser energy to the air. Each transceiver subsequently receives backscattered laser energy from the air. A portion of the backscattered laser energy received by each transceiver is filtered prior to electronic signal conversion.

In one embodiment, each transceiver includes a vapor filter that filters the backscattered laser energy within a predetermined band. In one example, a transceiver includes a fixed frequency vapor filter, such as an atomic vapor filter or a mercury vapor filter, that provides "notch" or "band stop" filtering of the backscattered laser energy. The band stop filter may provide peak absorption of background light within the band stop region of the filter. In one embodiment, the laser is tunable and generates the laser energy at a center-tuned wavelength that substantially corresponds to a center wavelength of the band stop of the vapor filter. In another embodiment, the center wavelength of the filter corresponds to an absorption region for ultraviolet wavelengths occurring in ozone ($O_3$). Once filtered, a transceiver converts the backscattered laser energy into a computer processable electronic signal for determination of the desired air parameters.

In one embodiment, each transceiver includes one or more detectors or transducers configured to receive filtered and unfiltered backscattered laser energy for conversion to electronic signals. In one example, a transceiver includes an optical transducer that converts a particular range of wavelengths to computer processable signals used to determine the desired air parameters. Accordingly, in one embodiment, the OADS includes a computer for processing the electronic signals to determine the desired air parameters. Other features are apparent within the description that follows.

DETAILED DESCRIPTION OF THE DRAWINGS

Figure 1:
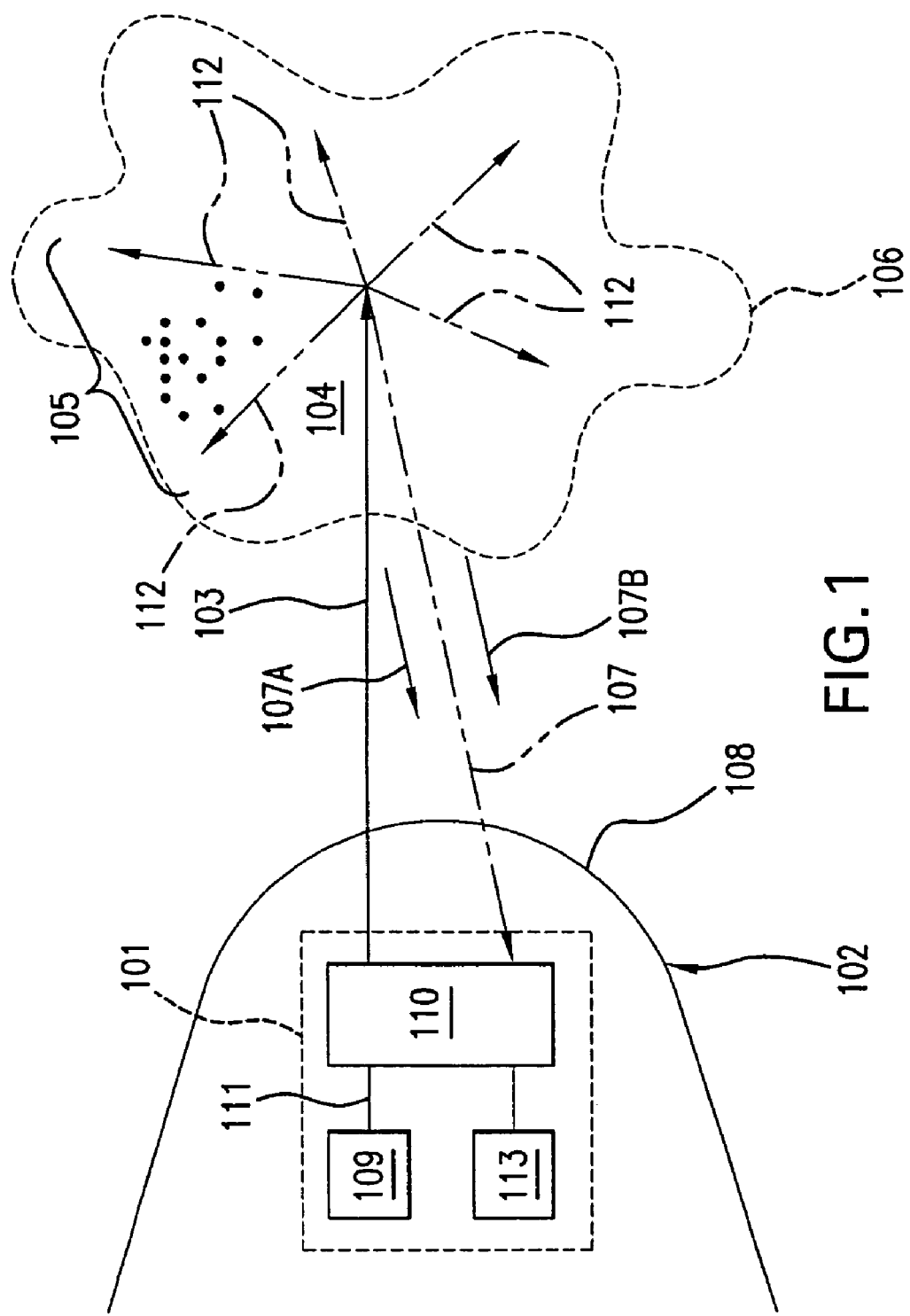
FIG. 1 shows one Optical Air Data System ("OADS")

FIG. 1 shows one Optical Air Data System ("OADS") 101 mounted on or within an aircraft 102. In this embodiment, OADS 101 is configured for projecting laser energy 103 (e.g., laser radiation) to air 104. Impingement of laser energy 103 on air 104 and aerosol particles 105 (in air 104) causes scattering of laser energy 103, which is represented in FIG. 1 as an energy scatter field 106. Distance between aircraft 102 and energy scatter field 106 is controlled by the amount of overlap between the out-going laser energy 103 and the transceiver 110 field of view at a distance from aircraft 102, to provide an optimized intensity for return laser energy 107 and to eliminate the overwhelming measurement error arising from displaced air proximate aircraft 102. OADS 101 detects return laser energy 107 that is backscattered from air 104 at laser energy scatter field 106. Laser energy 107 may be in the ultra-violet (UV) spectrum, for example, having a wavelength within a range of 250 nm to 270 nm. Other ranges operable to produce scatter field 106 may be used as matter of design choice.

Return laser energy 107 typically contains molecular scattered (e.g., Rayleigh) components 107A and/or aerosol scattered (Mie) components 107B. OADS 101 distinguishes the molecular scattered components 107A from the aerosol scattered components 107B and correspondingly determines one or more air parameters based on the scattered laser energy 107. Examples of such air parameters include air speed, air pressure, air temperature and aircraft orientation angles relative to the local wind. OADS 101 may be configured with other aircraft as well, such as unmanned air vehicles (UAVs), helicopters, gliders and space shuttles. Although illustrated within a "nose" 108 of aircraft 102, OADS 101 may be configured in any other areas of aircraft 102.

As shown in FIG. 1, OADS 101 includes a laser 109 configured for generating laser energy 103. Transceiver 110 is configured for transmitting laser energy 103, from laser 109 via optical coupling 111, and receiving backscattered laser energy 107. Optical coupling 111 may exist in the form of a fiber optic connection or free space transmission. Accordingly, transceiver 110 projects the laser energy as laser radiation 103 to air 104. Air 104 scatters laser radiation 103 at energy scatter field 106 in a plurality of directions (e.g., illustrated as vectors 112). Scatter field 106 also returns, or backscatters, laser radiation 107 towards transceiver 110, which subsequently receives the backscattered laser radiation 107. Transceiver 110 converts backscattered laser radiation 107 to processable electronic signals, via computer 113, to determine the air parameters.

Computer 113 communicatively couples with transceiver 110 and processes signals from transceiver 110 to distinguish molecular scattered component 107A from aerosol scattered component 107B. Computer 113 determines the air parameters based on laser radiation 107 backscattered from molecules and/or aerosols in air 104. Accordingly, as described below, computer 113 employs one or more digital signal processing algorithms to determine such parameters.

While OADS 101 illustrates one transceiver 110 in an exemplary embodiment, a plurality of transceivers may be used depending on application. For example, a helicopter employing OADS 101 may use two transceivers 110 to determine air parameters such as forward velocity (e.g., air speed) and a horizontal plane, or "yaw", of the helicopter. An airplane may use three transceivers 110 positioned in a particular manner to determine various aircraft geometries, such as angle of attack and sideslip, in addition to the air parameters of air speed, air pressure and air temperature. In addition, air vehicles (fixed wing and rotary) may employ three or more transceivers and/or lasers to increase Air Data System reliability through a redundant system architecture. Using three OADS transceivers mounted orthogonally to one another may fully resolve a total airspeed vector by providing three independent measurements for the air speed vector (i.e., corresponding to three axes of a Cartesian coordinate system). The transceivers are located in uncommon planes and their geometry respective of an aircraft center-line known. Vector algebra may then be used to determine the full airspeed vector, including forward air speed, angle-of-sideslip and angle-of-attack.

Figure 2:
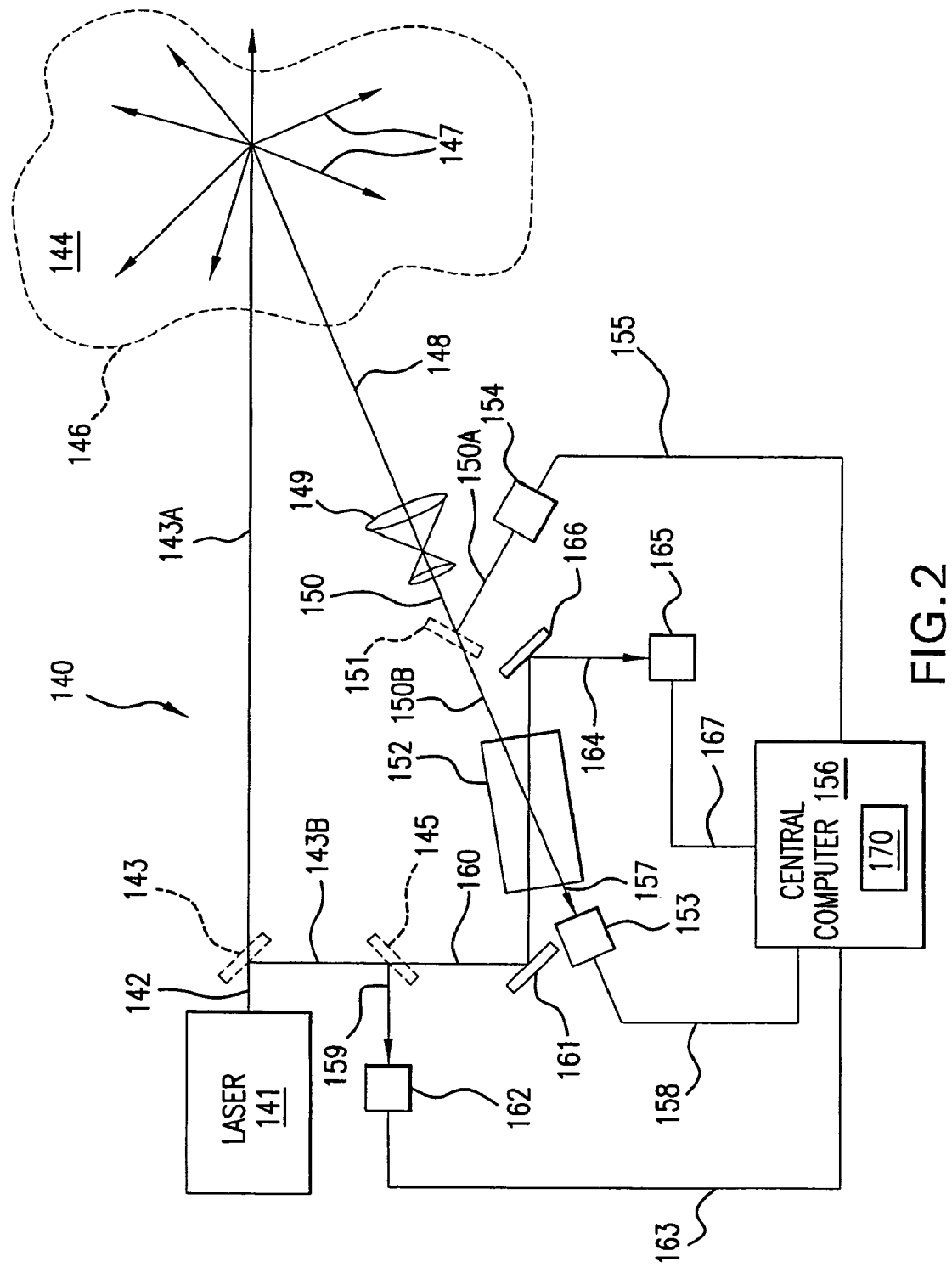
FIG. 2 shows one OADS.

FIG. 2 shows one OADS 140. OADS 140 illustrates another embodiment used for determining air parameters, such as those described in FIG. 1, based upon laser energy backscattered from both air molecules and aerosols. In this embodiment, OADS 140 includes laser 141 configured for generating laser energy 142. Laser 141 may be tunable laser having a tuned center wavelength of about 253.7 nm, although other wavelengths may be used. For example, laser 141 may be a frequency quadrupled, Nd:YAG (i.e., neodymium:yttrium-aluminum-garnet) pumped Ti:Sapphire (titanium-sapphire) laser. Alternatively, frequency-quadrupled Yb-doped (ytterbium-doped) fiber lasers can be used that offer important benefits of smaller size, lighter weight, increased robustness and improved reliability, as compared to Nd:YAG-pumped Ti:sapphire lasers. Laser 141 generates laser energy tunable across 40 GHz in about 100 MHz spectral steps. Additionally, laser 141 may tune +/−20 GHz about a center frequency of approximately 1182.5 THz, or c/253.7 nm, where c is the speed of light (approximately $3 \times 10^8$ m/s). Laser 141 radiates laser energy 142 to beam splitter 143, which splits the beam into two components 143A/143B. Component 143A is directed through air 144; component 143B is directed to beam splitter 145.

In particular, component 143A of laser energy 142 directed to air 144 is scattered into scatter field 146. Scattering of component 143A is illustrated by scattering vectors 147 in scatter field 146, whereas return scattering is illustrated by backscattered laser radiation 148. Component 143B of the laser energy 142 is used as a reference for comparison to backscattered laser radiation 148. Such a comparison is for example useful in determining air parameters such as air speed, since transmitted and received frequencies of the laser energy can be ascertained for use in a Doppler equation; such a process is explained in greater detail herein below.

In the illustrated embodiment, backscattered laser radiation 148 is received through optics 149. In one example, optics 149 is a telescope that demagnifies backscattered laser radiation 148 into a laser beam 150. Optics 149 also directs beam 150 to beam splitter 151, to split beam 150 into two components 150A/150B. Component 150B of beam 150 passes through vapor filter 152 to detector 153 to produce electronic signal 158 representative of the component 150B impinging detector 153; whereas component 150A is directed by beam splitter 151 to detector 154.

In one embodiment, detector 154 is a photodiode that receives laser 148 radiation and converts such radiation into an electronic signal 155. Detector 154 connects to a central computer 156 to process electronic signal 155. Similarly, detector 153 is a photodiode configured for detecting component 150B, which is filtered by vapor filter 152 as filtered component 157. Detector 153 converts component 157 to an electronic signal 158 for processing by central computer 156.

Accordingly, electronic signal 158 corresponds to backscattered laser energy 148 as filtered by vapor filter 152; and electronic signal 155 corresponds to unfiltered backscattered laser energy 148. Electronic signal 155 is thus used to nullify certain anomalies as computer 156 processes electronic signal 158. For example, when processed with electronic signal 158, signal 155 may be used to remove, from signal 158, certain laser transmission power fluctuations in filtered component 157 caused by atmospheric changes in air 144. Such a process is explained in more detail in FIGS. 4-7.

Reference component 143B of the laser energy 142 is split into two components 159/160 by beam splitter 145. Component 160 is directed by beam splitter 145 to vapor filter 152 via mirrored surface 161, to measure filter characteristics, whereas component 159 is directed by beam splitter 145 to detector 162, to generate electronic signal 163. Electronic signal 163 is for example used to normalize power fluctuations in the return of backscattered laser radiation 148 caused by power fluctuations in the generation of laser energy 142 by laser 141. Such a process is explained in more detail in FIGS. 4-7.

Vapor filter 152 filters component 160 to produce filtered component 164. Filtered component 164 is directed to detector 165, via mirrored surface 166, and then converted to an electronic signal 167. Central computer 156 processes electronic signal 167 to determine filter characteristics, such as frequencies and suppression features of the band stop region of vapor filter 152. Such a process is also explained in more detail in FIGS. 4-7.

It should be noted that FIG. 2 displays the OADS 140 using free space optical transmission and optical components, such as beam splitters 143, 145 and 151, and mirrors 161 and 166. However, a more environmentally robust method may use optical fiber for laser 141 energy transmission along paths 142, 143A, 143B, 159, 160, 164, 150, 150A, 150B and 157. In such an embodiment, fiber splitters are used for 143, 151 and 145 and mirrors 161 and 166 are eliminated.

Figure 3:
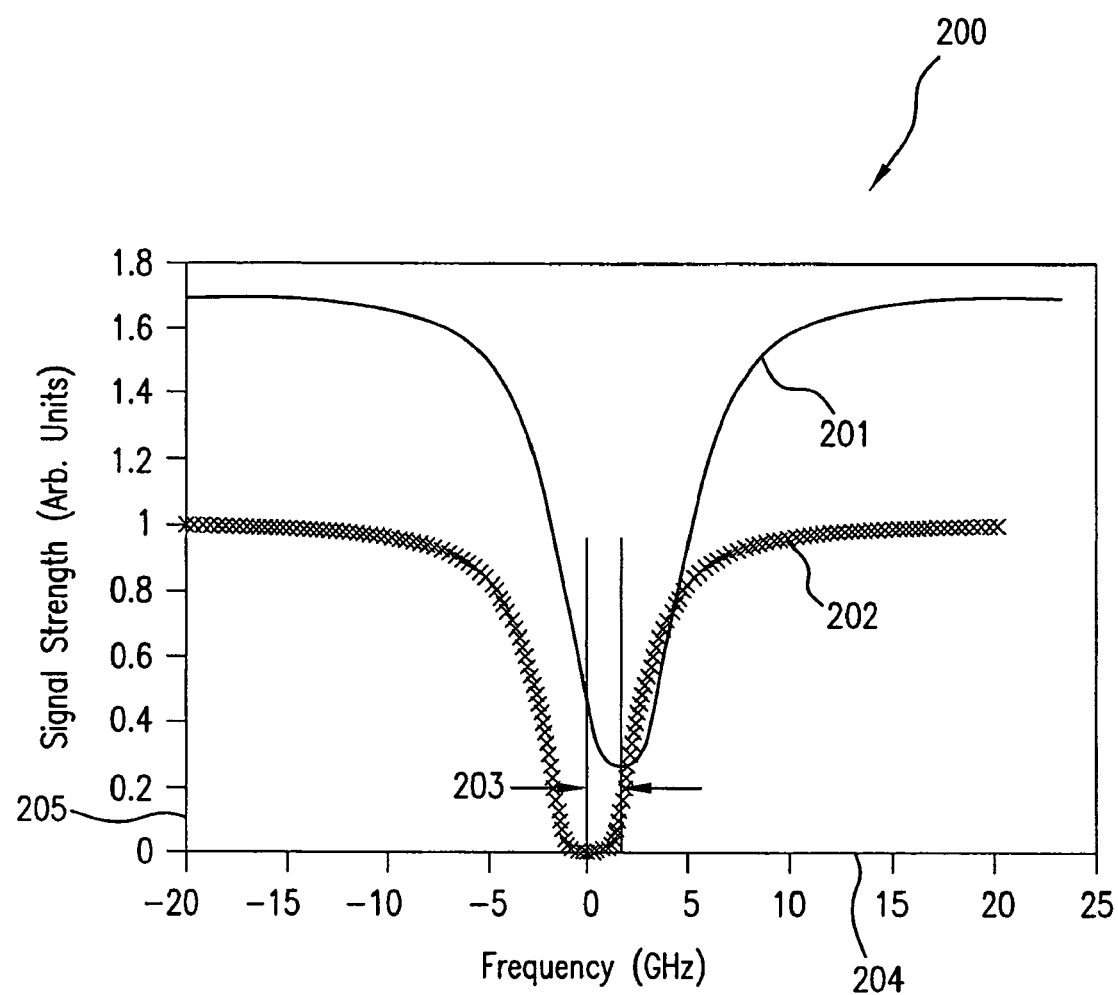
FIG. 3 shows one graph useful in illustrating exemplary an air speed calculation with an OADS.

FIG. 3 shows one graph 200 useful in illustrating an exemplary air speed calculation with OADS 140. Graph 200 shows two curves 201/202 comparing normalized laser energy magnitudes as a function of frequency (normalized laser energy magnitude plotted with respect to axis 205 and frequency plotted with respect to axis 204). Curve 202 exemplifies filtered radiated laser energy such as that of filtered component 164 of FIG. 2. As such, curve 202 shows filter characteristics of vapor filter 152 of FIG. 2 determined by processing of electronic signal 167. Curve 202 shows a peak absorption of filter 152 occurring at a down-translated frequency of 0 GHz. By way of example, the actual peak absorption frequency of filter 152 may be about 1182.5 THz (i.e., having a corresponding wavelength of about 253.7 nm).

Laser energy 142 generated by laser 141 passes through filter 152 to provide filtered component 164. Once filtered component 164 is converted to electronic signal 167 by detector 165, computer 156 analyzes and stores features of vapor filter 152 through digital signal processing of signal 172 (e.g., reference features under controlled conditions for use in future calculations). As shown in this example, features of vapor filter 152 have approximately 10% normalized absorption at approximately +/−5 GHz (i.e., 0.9 normalized transmission factor at approximately +/−5 GHz according to axis 205) about the peak absorption frequency. Other types of suitable filters may include different absorption/transmission features.

Curve 201 exemplifies filtered backscattered laser energy such as that of filtered component 157 of FIG. 2. In one embodiment, curve 201 is used to determine air speed by comparison to curve 202. For example, curve 202 illustrates how vapor filter 152 affects laser energy 142; curve 201 similarly illustrates how vapor filter 152 affects laser energy 142 as laser energy 142 is backscattered (e.g., returned laser radiation 148) from air 144. Frequency shift 203 represents the change in frequency of peak absorption for vapor filter 152 between transmitted laser energy 142 and returned laser energy 148. Computer 156 processes algorithms applying Doppler velocity equation to determine air speed from frequency shift 203.

To determine air speed in one embodiment, computer 156 determines how far in frequency the peak absorption frequency of filtered component 157 has shifted from the initial laser frequency by comparing curve 202 to curve 201 (e.g., comparing peak absorption frequencies of filtered components 157/164). The frequency shift 203 between the two frequencies substantially equates to a radial wind velocity through the Doppler velocity equation:

$$\Delta v_D = \frac{2v_R}{\lambda}, \quad \text{(Eq. 1)}$$

where $\Delta v_D$ represents the Doppler frequency shift, $v_R$ represents velocity component of the vehicle (e.g., aircraft 101 of FIG. 1) along the laser direction of propagation 143B and $\lambda$ represents the wavelength of laser energy 142.

In one embodiment, the wind velocity can be measured by determining the frequency shift from curve 202 of graph 200 as compared to curve 201 of graph 200. This is accomplished by calculating the symmetry point of both spectra 202 and 201 and determining the difference in symmetry points between the two curves.

FIGS. 4-9 show graphs illustrating exemplary calculations for other air parameters with OADS 140. For example, after determining frequency shift due to air speed as shown in FIG. 3, other air parameters, such as air temperature and air pressure may be calculated. In one example, computer 156 initially determines an intensity measurement of the detected backscattered laser radiation (e.g., filtered component 157 detected by detector 153) from electronic signal 158. This experimentally verified intensity measurement of returned laser energy corresponds to the following equation:

$$S_S(v) = P_L T_L D_S T_R E_S \int dv_r \int dv_l [L(v_l) F(v_r - v)(rR(v_r - (v_l - \Delta v_D)) + mM(v_r - \Delta v_D)))] \quad \text{(Eq. 2)}$$

where $S_S(v)$ is electronic signal 158 from detector 153; $P_L$ is the laser power, $T_L$ is the transmission coefficient through air 144 along laser path 143B, $L(v_l)$ is the laser line shape inherent to the laser 141 output as a function of laser frequency $v_l$, $T_R$ is the transmission coefficient through air 144 along laser path 148, $E_S$ is optical efficiency of the detector channel through detector 153, $F(v)$ is the band stop frequency range of vapor filter 152 centered at a frequency of v, R is Rayleigh scattering as a function of frequency (applicable to the Rayleigh regime) $v_r$ for backscattered laser radiation minus the quantity of laser frequency $v_l$ minus the Doppler shift $\Delta v_D$, r is the Rayleigh scattering magnitude coefficient dependent on air density and the Rayleigh backscattering coefficient, M is Mie scattering as a function of $v_r$ minus the quantity of $v_l$ minus $\Delta v_D$, m is the Mie scattering magnitude coefficient dependent on aerosol concentration and the Mie backscattering coefficient, and $D_S$ is detector 153 efficiency of the detector channel 158. The Rayleigh backscattering coefficient r and the Mie backscattering coefficient m are constant for a particular atmosphere. These coefficients correspond to the number of scatterers (i.e., molecules for Rayleigh, aerosols for Mie) per unit volume of atmosphere.

With a result obtained for the measured intensity of the returned laser energy, computer 156 commences the process of determining the other air parameters. Such a process, for example, begins with determining characteristics of vapor filter 152 via the transmission of reference laser energy through vapor filter 152 (e.g., component 160). For example, measuring the band stop characteristics of vapor filter 152 with laser 141 (e.g., via component 143B to electronic signal 167) during experimentation yields a convolution of the laser wavelength and the filter according to the following equation:

$$S_F(v) = P_L E_F D_F \int dv_l [L(v_l) F(v_l - v)], \qquad \text{(Eq. 3)}$$

where $S_F(v)$ is signal 167 from detector 165 as a function of frequency $v$ (e.g., as illustrated in curve 122); $E_F$ is the optical efficiency of filter 152 collection along paths 160 and 164, and $D_F$ is the optical efficiency of detector 165.

Note that all optical efficiencies $E_F$ and $E_S$ capture signal losses that are optical in nature. For example, the optical efficiency for detector 165, $D_F$, includes the optical beam splitting ratios for beam splitters 143 and 145, the optical transmission and coupling across filter 152 and the optical delivery efficiency onto detector 165. The optical collection efficiency for detector 153, $E_S$, includes the collection efficiency of telescope 149, the optical coupling efficiency into path 150, the beam splitter ratio of beam splitter 151, the transmission efficiency across filter 152 and the delivery efficiency onto detector 153. Detector efficiencies $D_F$ and $D_S$ include the detector conversion efficiencies for detectors 165 and 153, respectively. Thus, $D_F$ is the conversion efficiency whereby detector 165 converts laser energy along path 164 into an electrical signal 167. Likewise, $D_S$ is the conversion efficiency whereby detector 153 converts laser energy along path 157 into an electrical signal 158.

Backscattered laser radiation 148 can include power fluctuations that are caused by laser 141 while generating laser energy 142. Accordingly, laser energy detected by detector 162 (e.g., via component 159) assists in normalizing power fluctuations attributable to laser 141 by removing such power fluctuations from the analysis. In one embodiment, detector 162 converts the laser energy into electronic signal 163. In turn, computer 156 processes and normalizes according to the following equation:

$$S_L = P_L E_L D_L \int dv\, L(v), \qquad \text{(Eq. 4)}$$

where $S_L$ is the electronic signal 163 from detector 162, $E_L$ is the optical collection efficiency for detector 162, $D_L$ is the conversion efficiency of detector 162 and $P_L$ is the power of laser 141. Note that the optical collection efficiency $E_L$ includes the beam splitting ratios of beam splitters 143 and 145 and the delivery efficiency of laser beam path 159 onto detector 162.

Figure 4:
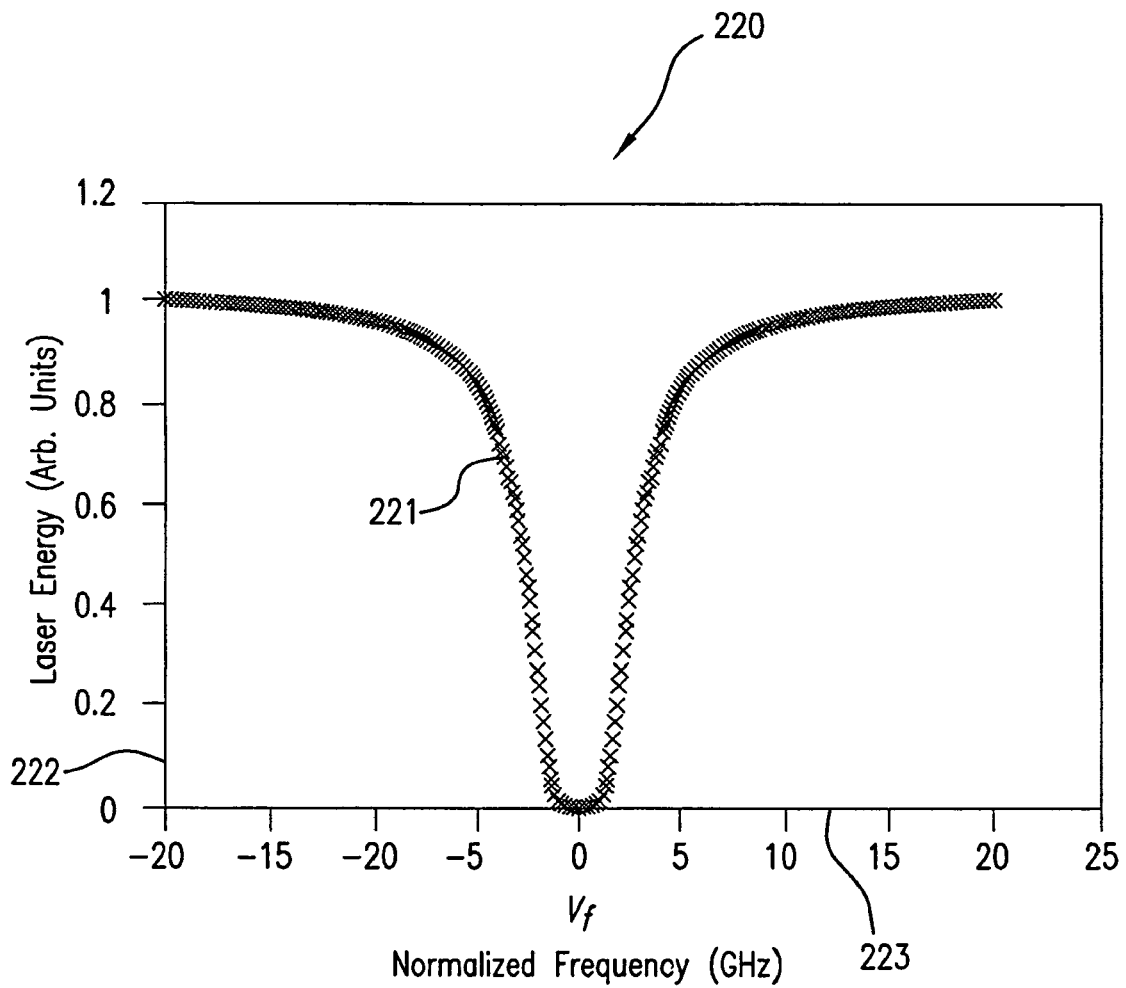
FIGS. 4-9 show graphs illustrating exemplary calculations for other air parameters with an OADS.

Curve 221 of FIG. 4 represents the magnitude of laser energy (component 164) filtered by vapor filter 152 and normalized between 0 and 1. Curve 221 represents the magnitude of the laser energy as a function of frequency (i.e., laser energy magnitude plotted with respect to axis 222 and frequency plotted with respect to on axis 223). Curve 221, therefore, illustrates filtered laser energy via component 160 as determined by computer processing of electronic signal 167, plotted as laser energy magnitude normalized between 0 and 1 versus frequency.

In one embodiment, the absorption/transmission characteristics of the vapor filter 152 are normalized using Eqs. 3 and 4. Eq. 3 yields the stop band characteristics of filter 152 and Eq. 4 accounts for power fluctuations in the generation of laser energy 142. With the power fluctuations of Eq. 4 substantially removed, a "normalization channel" is revealed and power fluctuations attributable to atmospheric changes can be accounted for.

In one embodiment, additional power fluctuations caused by atmospheric changes in air 144 are also removed. For example, laser energy detected by detector 154 (e.g., via component 150A) assists in removing laser power fluctuations caused by atmospheric changes in air 144. Accordingly, detector 154 converts received laser energy into electronic signal 155. Computer 156, in turn, processes electronic signal 155 to determine the normalized laser energy magnitude according to following equation:

$$S_N = P_L T_L T_R E_N D_N \int dv \int dv_l [L(v_l)(r R(v - (v_l - \Delta v_D)) + m M(v - (v_l - \Delta v_D)))], \qquad \text{(Eq. 5)}$$

where $S_N$ is the signal 155 from detector 154; $E_N$ is optical collection efficiency of the detector 154 and $D_N$ is the conversion efficiency of detector 154.

In one embodiment, it is advantageous to normalize the various characteristic functions to enable a closed-loop solution to the process of determining temperature and pressure. In one example, therefore, computer 156 calculates the normalized laser line shape according to following equation:

$$\int L(v_l) dv_l = 1, \qquad \text{(Eq. 6)}$$

where (as before) $v_l$ is laser line shape frequency and L denotes the laser line shape as a function of frequency. In another example, computer 156 calculates normalized Rayleigh Function according to the following equation:

$$\int R(v_r) dv_r = 1, \qquad \text{(Eq. 7)}$$

where R denotes the Rayleigh line shape as a function of frequency $v_r$, applicable to the Rayleigh regime. In another example, computer 156 scales the electronic signal 167 recorded from detector 165 by dividing all recorded values by the maximum value according to the following equation:

$$MAX(S_F(v)) = 1, \qquad \text{(Eq. 8)}$$

where MAX denotes an operation that finds a maximum value of a particular function, and $S_F$ denotes electronic signal 167 measured from detector 165, as a function of frequency $v$ (e.g. as illustrated in curve 221 of FIG. 4). In another example, computer 156 normalizes the Mie Function according to the following equation:

$$M(v) = \delta(v), \qquad \text{(Eq. 9)}$$

where $\delta(v)$ is the delta function.

In one embodiment, dividing the signal 167 collected from detector 165 (and represented by Eq. 3, above) by the signal 163 collected from detector 163 (and represented by Eq. 4, above) removes laser 141 power fluctuations, as follows:

$$\frac{S_F(v)}{S_L(v)} = \frac{P_L E_F D_F \int dv_l[L(v_l)F(v_l - v)]}{P_L E_L D_L \int dv L(v)} \qquad \text{(Eq. 10)}$$

Equation 10 can be simplified to:

$$\frac{S_F(v)}{S_L(v)} = \frac{E_F D_F}{E_L D_L} LF(v) \qquad \text{(Eq. 11)}$$

In one embodiment, tuning the laser 141 to a frequency ($v_A$) far enough removed from the effects of the vapor filter 152 enables the measurement of the ratio of the optical and detector efficiencies of the signal channels 167 ($S_F$, represented by Eq. 3 above) and 163 ($S_L$, represented by Eq. 4 above). This, in turn, enables the normalization of the signal 167 measurement to one, for simultaneously checking for laser, detector and filter abnormalities on a scan-by-scan basis:

$$\frac{S_F(v_a)}{S_L(v_a)} = \frac{E_F D_F}{E_L D_L} \qquad \text{(Eq. 12)}$$

In one embodiment, LF(v) are determined to generate a look up table of the convolution of theoretical Rayleigh functions (calculated in terms of temperature and pressure) with the measured filter function. Since, the measured filter function is already the convolution of the laser and filter spectra, convolving the Rayleigh function with the measured filter signal 167 yields the expected return signal from an atmosphere of pure Rayleigh scatterers.

In one embodiment, the measured signal 158, which is the backscatter return from the atmosphere 144, that passes through the vapor filter 152 (and is represented by Eq. 2 above), is divided by the signal 155, which is the backscatter return from the atmosphere 144, that does not pass through vapor filter 152 (and is represented by Eq. 5 above). This removes changes in signal transmission that are independent of the factors to be measured:

$$\frac{S_S(v)}{S_N(v)} = \frac{P_L T_L T_R E_S D_S \int dv_l dv_r (L(v_l)F(v_1 - v))(rR(v - (v_r - \Delta v_D)) + mM(v - (v_r - \Delta v_D)))}{P_L T_L T_R E_N D_N \int dv_l dv_r L(v_1)(rR(v - (v_r - \Delta v_D)) + mM(v - (v_r - \Delta v_D)))} \qquad \text{(Eq. 13)}$$

Since M is a delta function, Equation 13 simplified to:

$$\frac{S_S(v)}{S_N(v)} = \left[\frac{E_S D_S}{E_N D_N}\right] \frac{rLFR(v - \Delta v_D) + mLF(v - \Delta v_D)}{r + m} \qquad \text{(Eq. 14)}$$

In one embodiment, tuning laser 141 to a frequency ($v_A$) far enough removed from the effects of the vapor filter 152 enables the measurement of the ratio of the optical and detector efficiencies of the signal channels 158 ($S_S$ as represented by Eq. 2 above) and 155 ($S_N$ as represented by Eq. 5 above). This enables a check for abnormalities in the filter on a scan-by-scan basis:

$$\frac{S_S(v_a)}{S_N(v_a)} = \frac{E_S D_S}{E_N D_N} \qquad \text{(Eq. 15)}$$

In one embodiment, a variable $K_a$ can be defined as:

$$K_a = \frac{S_S(v_a)}{S_N(v_a)} \qquad \text{(Eq. 16)}$$

Once both data sets (i.e., $S_S$ and $S_N$) are symmetric about the same data point, computer 156 calculates temperature and pressure from the return signal. Initially, computer 156 uses theoretical Rayleigh functions which are functions of temperature and pressure in conjunction with the measured filter transmission to generate a lookup 170 table of laser, Rayleigh, and filter (LRF(v)) convolutions that are dependent on atmospheric temperature and pressure. Computer 156 then compares the normalized return signal to the lookup table 170 to determine atmospheric temperature and pressure. In order to compare the return signal with the lookup table 170 computer 156 accounts for the magnitude of the Mie scatterers as well as any changes in air density, which changes the magnitude of the Rayleigh signal.

The vapor filter is used as a bandstop filter for frequency stability, optical depth, and optimal filter shape. For the purposes of separating the Rayleigh and Mie scattering, an optical depth of approximately 60 dB provides excellent absorption of Mie scattering within a small frequency variance around $v_0$ (i.e., where $v_f$ is a normalized frequency of 0 GHz). For example, the 60 dB of absorption in the atomic vapor cell exists in a region that is not contaminated by Mie scattering. This 60 dB absorption region is used in acquiring initial estimates of pressure and temperature (explained below in FIG. 5). Such absorption is observable below in FIG. 5 as the measured signal $S_F$ which has the magnitude of zero centered about $v_0$. This data provides information about pure Rayleigh scattering that can be used to calculate the ratio of Mie scattering to Rayleigh scattering, as shown in Eq. 17:

$$\frac{S_S(v_0)}{S_N(v_0)} = \left[\frac{E_S D_S}{E_N D_N}\right] \frac{rLFR(v_0) + mLF(v_0)}{r + m} \qquad \text{(Eq. 17)}$$

Since the vapor filter fully attenuates the Mie scattering in this region:

$$\frac{S_S(v_0)}{S_N(v_0)} = \left[\frac{E_S D_S}{E_N D_N}\right] \frac{rLFR(v_0)}{r + m}, \qquad \text{(Eq. 18)}$$

where $LFR(v_0)$ is the value of the theoretical return signal at particular atmospheric temperature and pressure. Accordingly, computer 156 calculates the ratio of Mie scattering by first defining a variable $K_0$ as follows:

$$K_0 = \frac{S_S(v_0)}{S_N(v_0)} \quad \text{(Eq. 19)}$$

and then solving for the ratio $$\frac{m}{r} = \frac{K_0}{K_a} LFR(v_0) - 1 \quad \text{(Eq. 20)}$$

Using the normalized signal return in the region of interest (i.e., the sloped region between the minimum and maximum of the signal return) and writing the result in terms of the ratio of m over r, yields the following:

$$\frac{S_S(v)}{S_N(v)} = K_a \frac{LFR(v) + \frac{m}{r}LF(v)}{1 + \frac{m}{r}} \quad \text{(Eq. 21)}$$

Substituting the ratio of m and r of Eq. 20 into Eq. 21 yields:

$$\frac{S_S(v)}{S_N(v)} = K_a \frac{LFR(v)}{LFR(v_0)} + LF(v)\left[1 - \frac{K_0}{K_a LRF(v_0)}\right] \quad \text{(Eq. 22)}$$

Solving for $LRF(v)$ yields:

$$LRF(v) = \frac{S_S(v)}{S_N(v)} \frac{LFR(v_0)}{K_a} + LF(v)\left[\frac{1}{K_a} - \frac{LFR(v_0)}{K_0}\right], \quad \text{(Eq. 23)}$$

where the measured signal return $LRF(v)$ is written in terms of measured quantities and the theoretical values of $LRF(v_0)$. Computer 156 then calculates $LRF(v)$ and compares it to the lookup table 170 to determine atmospheric temperature and pressure, described in greater detail in FIG. 5.

Accounting for power fluctuations, optical efficiencies and detector efficiencies, as described herein, allows for an independent check on vapor filter 152 during the operation OADS 140. With variable characteristics of detector channels and power fluctuations accounted for, computer 156 determines, for example, the substantially invariable characteristics of vapor filter 152, such that more accurate measurements of received backscattered laser radiation (e.g., laser radiation 148) are obtained.

In one embodiment, the normalization channel depicted in FIG. 4 is used to remove atmospheric power fluctuations of laser radiation 148. In doing so, computer 156 measures Rayleigh and Mie components of laser radiation 147 in terms of optical efficiencies and detector efficiencies. Such efficiencies are typically measured on a shot-by-shot basis during the analysis process. In an exemplary operation, laser 141 generates and transmits laser energy 142 as a series of pulses at a particular pulse repetition frequency ("PRF"). Computer 156 then measures the Rayleigh and Mie components in terms of optical efficiencies and detector efficiencies on a pulse-by-pulse basis.

To measure Rayleigh components and Mie components, in one embodiment, OADS 140 tunes the frequency of the laser energy 142 transmitted by laser 141. For example, laser 141 transmits the laser energy 142 at distal frequencies from the peak absorption frequency of filter 152 (illustrated by $v_f$ in FIG. 4) to provide a frequency-independent measurement. Computer 156 then determines the line shape of laser energy 142 through filter 152.

In one embodiment, measured intensity of the detected backscattered laser radiation (e.g., as determined by electronic signal 158) is functionally compared to normalized atmospheric factors. Since the measured intensity often depends upon Mie scatterers (e.g., aerosols) and air density changes due to altitude changes and temperature changes. The air density changes and the temperature changes are not, however, removed through the normalization processes described herein; for computer 156 to accurately determine air parameters such as temperature and pressure of air 144, air density changes are removed from the detected backscattered laser radiation so that computer 156 can accurately determine the air parameters.

Figure 5:
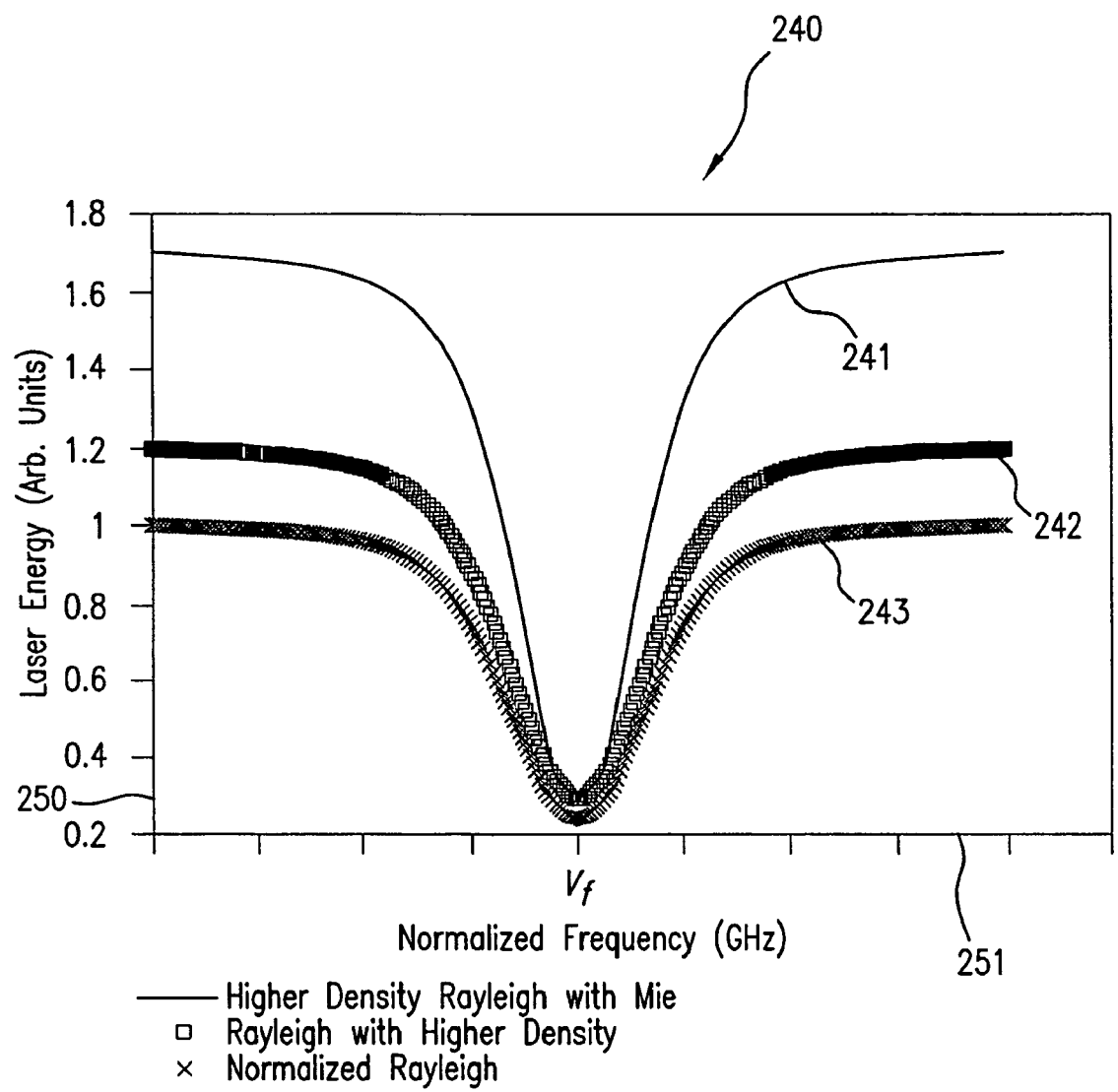

FIG. 5 shows graph 240 with curves 241 (detected backscattered laser radiation at an air density causing Rayleigh scattering), 242 (detected backscattered laser radiation at a higher air density causing both Rayleigh and Mie scattering) and 243 (theoretically pure Rayleigh scattering). Curves 241, 242 and 243 illustrate laser energy magnitudes (plotted with respect to axis 250) as a function of frequency (plotted with respect to axis 251). In one embodiment, computer 156 processes data from curves 241, 242 and 243 to determine other air parameters. For example, Mie scattering effects are substantially isolated and removed from calculations to determine air temperature and air pressure, since these Mie scattering effects produce inaccurate measurements due to inconsistent aerosol concentrations.

To determine the air temperature and air pressure, computer 156 processes the data from curves 241, 242 and 243 to substantially isolate and remove the Mie scattering effects, such as those found in curve 242. In processing the data from curves 241, 242 and 243, computer 156 calculates lookup table 170 in substantially real time using a measured laser/filter profile (i.e., as measured at detector 165 of FIG. 2) convolved with theoretical Rayleigh functions for a particular temperature and pressure (e.g., illustrated by curves 242 and 243). Computer 156 then scales the measured return signal $LFR(v)$ (i.e., illustrated by curve 241 in this example) with the ratio of m to r determined by Eq. 20. Computer 156 then analyzes data near the deepest portion of the filter attenuation (i.e., approximately +/−0.5 GHz from $v_f$) to estimate pressure and/or temperature. This portion corresponds to a 60 dB region of absorption not contaminated by Mie scattering, a preferred aspect of the invention that provides temperature and pressure accuracy by providing a reliable temperature base from which to increment temperature and/or pressure estimates.

Computer 156 calculates theoretical Rayleigh return assuming an initial temperature estimate and performs a Least Square Error (LSE) calculation to determine the accuracy of the temperature with respect to the theoretical Rayleigh function. Computer 156 repeats the process with incremental changes to temperature and/or pressure until an optimal fit (i.e., a LSE calculation that corresponds to design specifications) is achieved. Although discussed in detail with respect to LSE, other approximation methods, such as Newton-Rhapson and Monte Carlo, may be used in alternative embodiments. Accordingly the invention is not intended to be limited to the calculation methods of the embodiments described herein.

Temperature affects air density in a manner that is reciprocal to pressure; increasing pressure increases density, while increasing temperature decreases density. Additionally, increasing temperature increases the Rayleigh lineshape width while increasing pressure increases the Rayleigh lineshape height. Accordingly, for each incremental value of temperature and/or pressure, the Rayleigh lineshape is unique. Those skilled in the art should readily understand that such scattering theory is generally defined in "On The Kinetic Model Description Of Rayleigh-Brillouin Scattering From Molecular Gases", G. C. Tenti, D. Boley and R. C. Desai, Canadian Journal of Physics, vol. 52, pg. 285-290 (1974).

In one example, computer 156 determines air density changes by aligning peak absorption frequencies of curves 241, 242 and 243, illustrated at frequency $v_f$. Since curve 241 represents detected backscattered laser radiation containing substantially no Mie scattering, curve 241 can be used as a reference where Mie scatterering has been eliminated. In one example, computer 156, therefore, uses curve 243 to remove the effects of Mie scattering, aligning curves 241, 242 and 243 and by calculating a ratio of the detected backscattered laser radiation to a theoretically pure Rayleigh scattering which then determines air density (the ratio of curves 241 and 242). Mie scattering effects are then removed by subtracting curve 243 from the calculated ratio of curves 241 and 242. With the Mie scattering essentially removed from the measurement, computer 156 more accurately determines air temperatures and air pressures.

Figure 6:
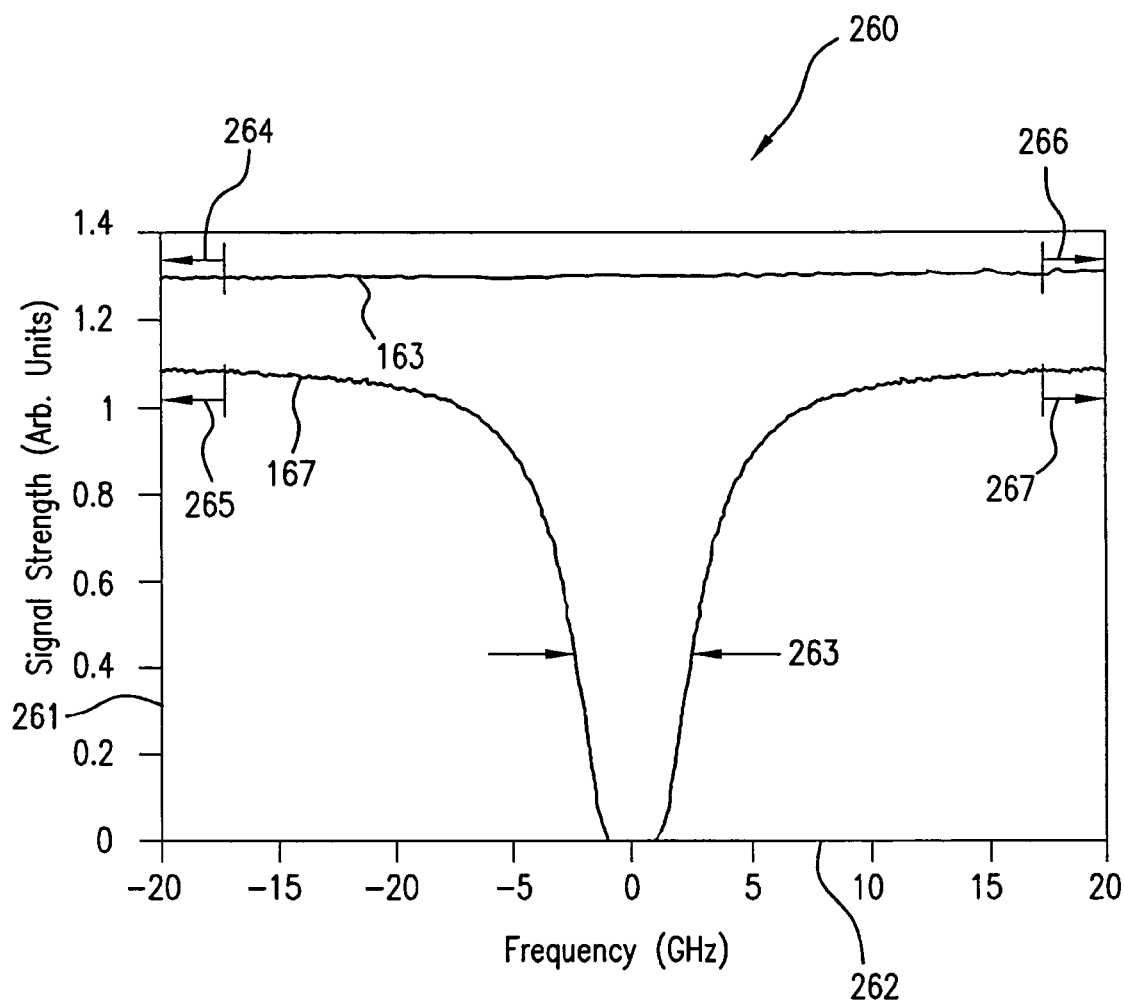
Figure 7:
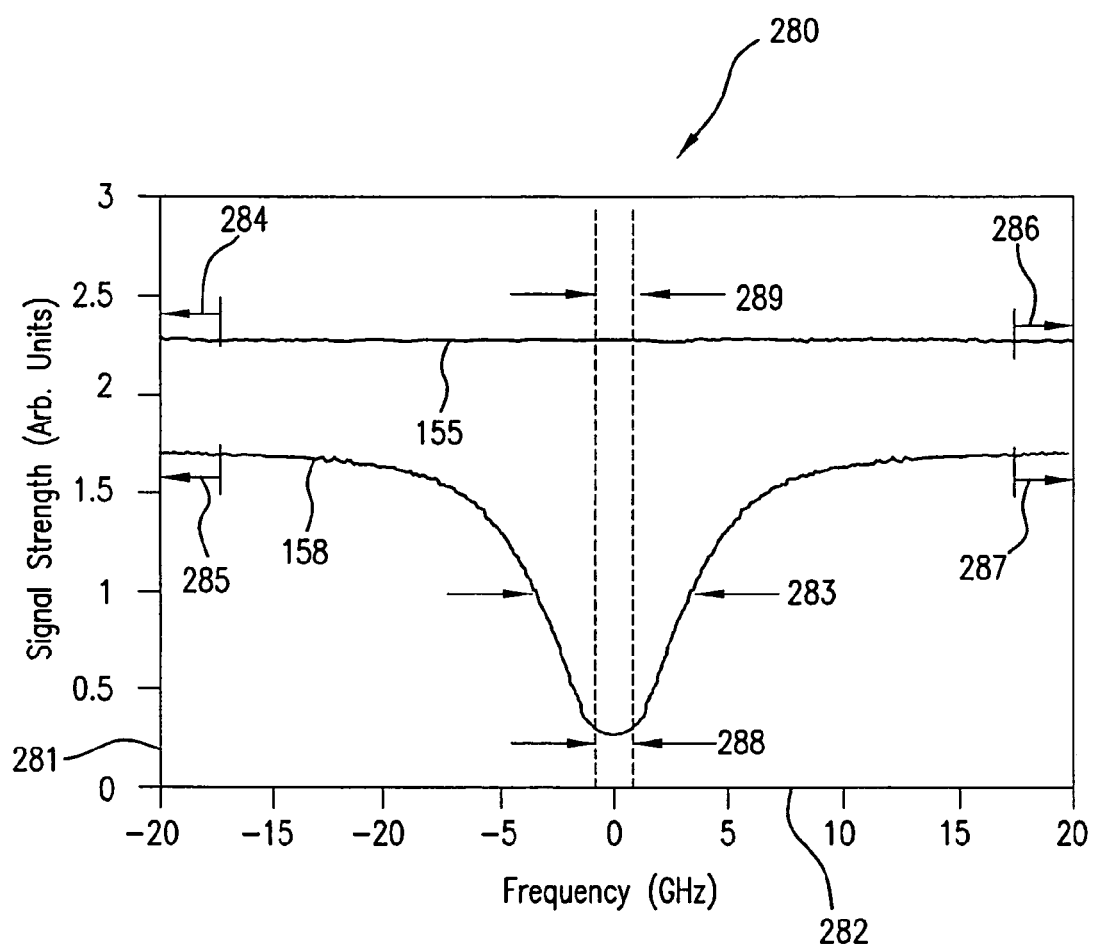

FIGS. 6 and 7 show other exemplary graphs that may be used in determining air pressure and air temperature. FIG. 6 illustrates a graph 260 of electronic signals 163 and 167 of FIG. 2 respectively generated by detectors 162 and 165 of FIG. 2. Graph 260 shows the electronic signals 163/167 representing light intensity as a function of normalized signal strength (axis 261) versus frequency (axis 262). FIG. 7 illustrates a graph 280 of electronic signals 158 and 155 of FIG. 2 respectively generated by detectors 153 and 154 and representing light intensity as a function of normalized signal strength (axis 281), versus frequency (axis 282). These four light intensities (represented by electronic signals 163, 167, 158 and 155) are measured, over time, through a collection of laser pulses. For example, the laser energy 142 of FIG. 2 generated by laser 141 at a certain PRF is swept in transmitted frequency such that each laser pulse is emitted at a different frequency. Electronic signals 163 and 167 therefore illustrate how laser 141 may sweep laser energy 142 in frequency across an absorption band 263 of the vapor filter 152. Illustratively, FIG. 6 shows one complete frequency sweep of laser energy 142 generated by laser 141 and detected by detectors 162 and 165. Similarly, electronic signals 155 and 158 of FIG. 7 show detected signals of detectors 162 and 165 (backscattered) as laser 141 performs a complete sweep in frequency of laser energy 142 across the absorption band 283 of the vapor filter 152.

From signals 163 and 167, computer 156 may for example determine a normalized filter transmission, by dividing discrete points of electronic signal 167 by corresponding discrete points of signal 163. Similarly, computer 156 may determine a normalized atmospheric return though vapor filter 152 by dividing discrete points of signal 158 by corresponding discrete points of signal 155. These discrete points, described herein, correspond to individual pulses of laser energy 142.

Using normalized calculations of filter transmission (e.g., from graph 260) and the normalized calculations of atmospheric return (e.g., from graph 280), computer 156 determines relative optical efficiencies in the vapor filter 152.

In one embodiment, computer 156 determines optical transmission for vapor filter 152 using the frequency independent components of data from graph 260; FIG. 6 (there is substantially no change in amplitude for signals 163 and 167 at frequencies greater in magnitude than ±18 GHz from 0 GHz illustrated at points 264, 265, 266 and 267). Computer 156 therefore determines the ratio of optical transmission for vapor filter 152 by calculating a ratio of signal 167 to signal 163, via frequency corresponding points of the signals, for points representing frequencies greater in magnitude than ±18 GHz from 0 GHz.

Similarly, computer 156 determines a magnitude of intensity of atmospheric-returned laser energy received through vapor filter 152 using the frequency independent parts of the data from graph 280 of FIG. 7 (there is substantially no change in amplitude for signals 155 and 158 at frequencies greater in magnitude than ±18 GHz from 0 GHz illustrated at points 284, 285, 286 and 287). Computer 156 thereby determines a ratio of atmospheric return with the laser power measurement by calculating a ratio of signal 158 to signal 155 via frequency corresponding points of the signals for points representing the frequencies greater in magnitude than ±18 GHz from 0 GHz.

In one embodiment, computer 156 calculates a ratio of signal 158 to signal 155 for frequencies between ±0.5 GHz (illustrated at points 288 and 289). Such a frequency range substantially no Mie scattering of laser energy 142 for air 144; it thus indicates substantially pure Rayleigh scattering. Computer 156 thus compares a Rayleigh to Mie scattering strength based upon the ratio of signal 158 to signal 155. Computer 156 determines Rayleigh to Mie scattering strength by comparing the ratio of signal 158 to signal 155 at frequencies between ±0.5 GHz to the ratio of signal 158 to signal 155 at frequencies greater than ±18 GHz from 0 GHz. In one embodiment, computer 156 performs similar calculations for "non-scattered" laser energy 142 (e.g., component 143B of FIG. 2) based on data illustrated in FIG. 6 using points 268 and 269. Such a process is further described in FIG. 11.

The ratios determined for the non-scattered laser energy 142 and for the scattered laser energy 142 may be used in tandem to numerically calculate Rayleigh-Laser-Filter convolution from data. The Rayleigh-Laser-Filter convolution is in turn compared to a look up table of theoretical Rayleigh-Laser-Filter convolution values to determine temperature and pressure.

Figure 8:
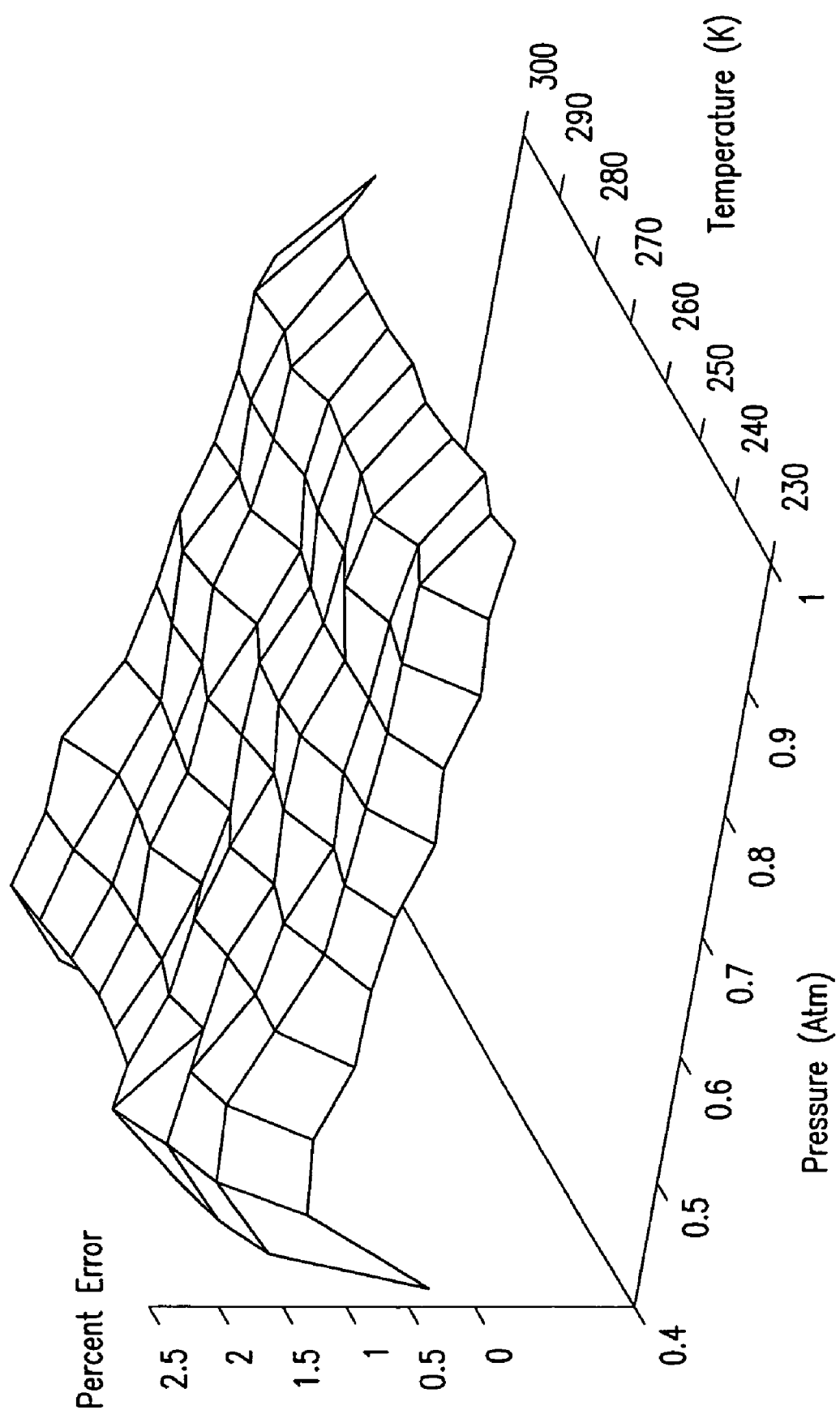
Figure 9:
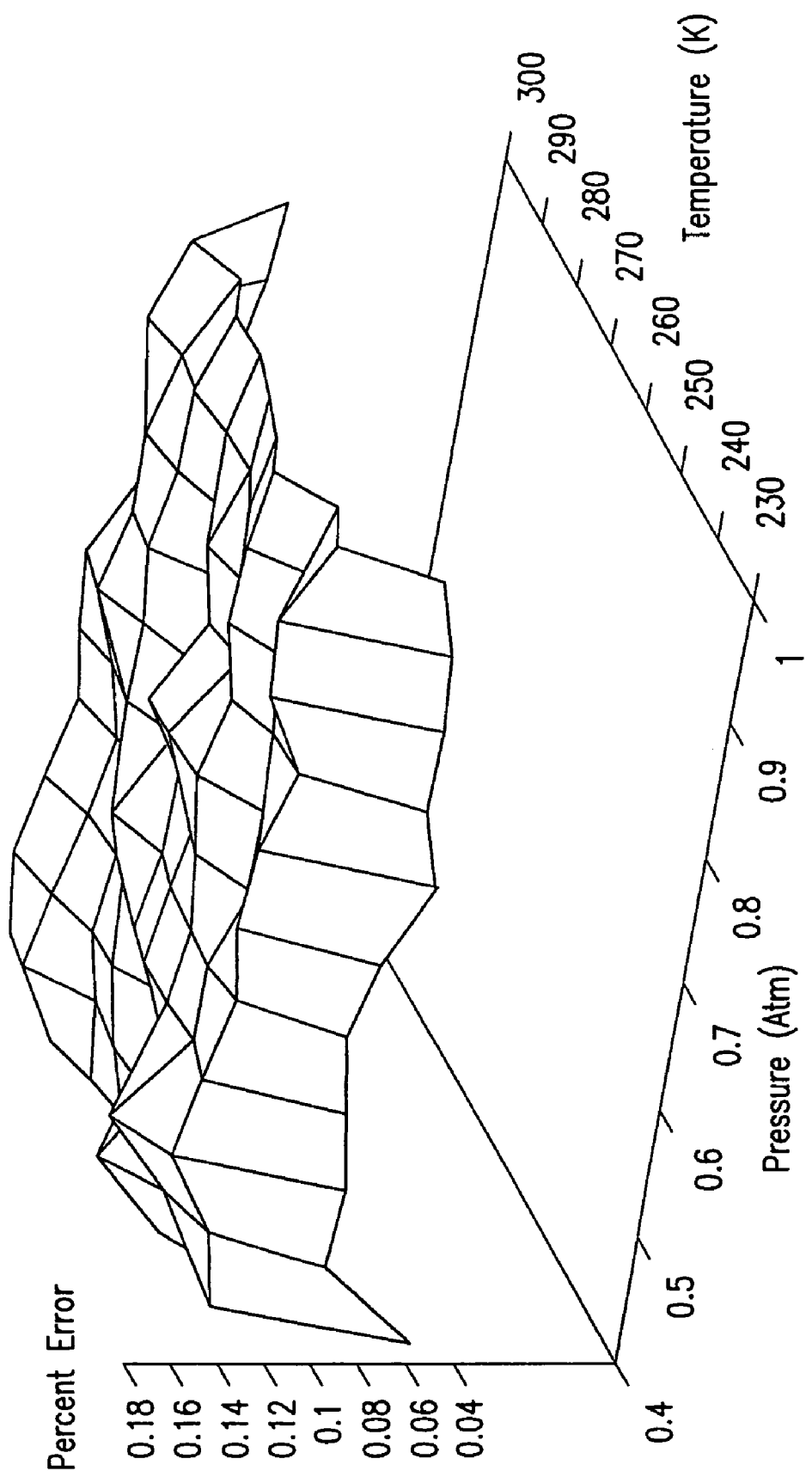

FIGS. 8 and 9 represent errors in pressure and temperature measurements obtained during experimentation. FIG. 6 shows the percentage error in pressure measurements as a function of pressure and temperature, obtained using synthetic data with a 0.5% noise component. FIG. 9 shows the percentage error in temperature measurements as a function of pressure and temperature obtained using synthetic data with a 0.5% noise component.

Figure 10:
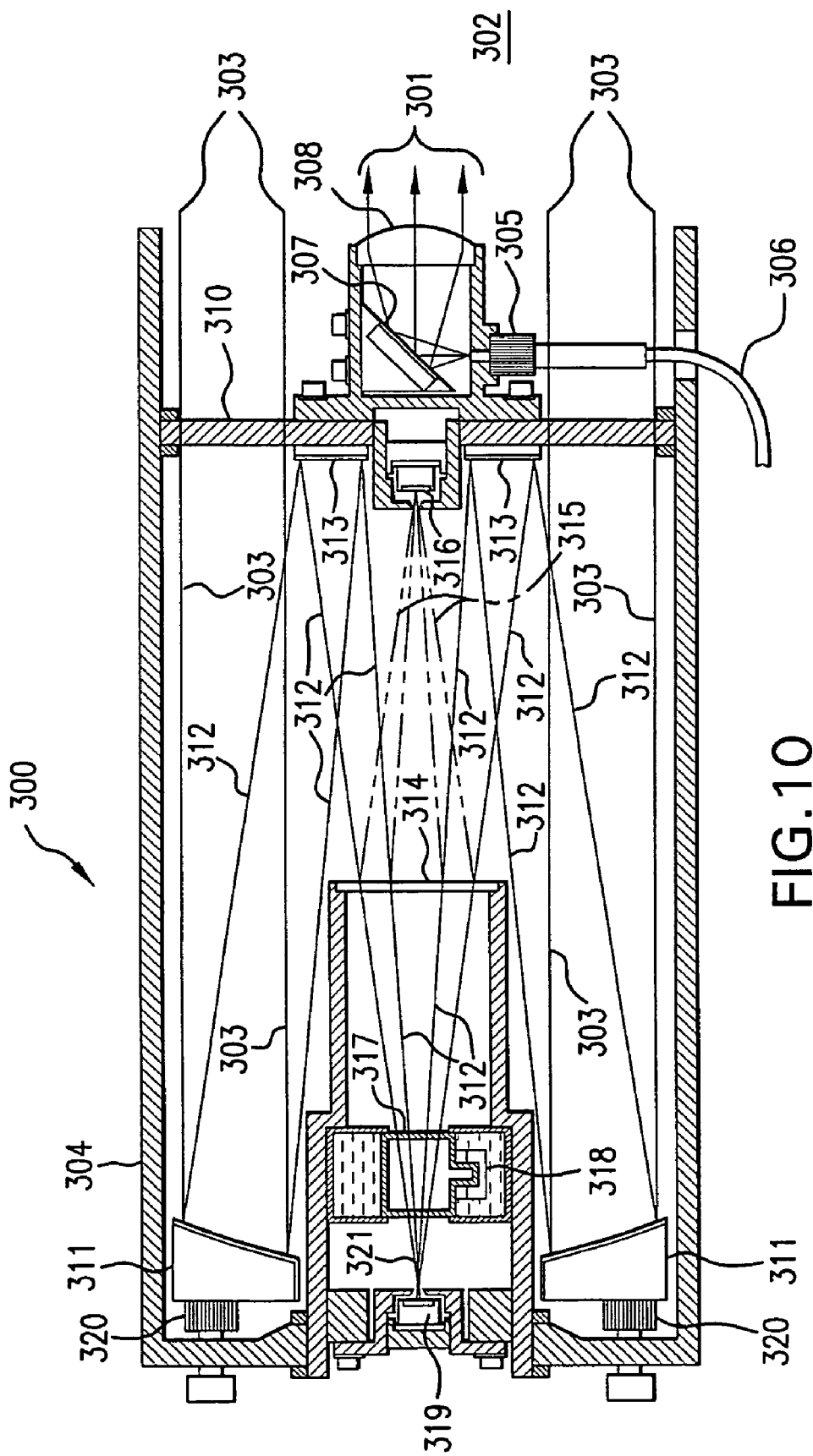
FIG. 10 shows one OADS transceiver.

FIG. 10 shows one OADS transceiver 300. OADS transceiver 300 is for example suitable for use as transceiver 110 of FIG. 1. OADS transceiver 300 is illustrated in FIG. 10 as a midsectional view to reveal interior components of the transceiver. In one embodiment, OADS transceiver 300 is hermetically sealed and configured for projecting laser radiation 301 to air 302 and for detecting backscattered laser radiation 303. Optical coupling 305 connects to optical fiber 306. Optical fiber 306 communicates laser energy radiated from a laser to project laser radiation 301 to air 302. OADS transceiver 300 may include beam steering optics 307 and lens 308 to assist in the projection of radiation 301.

OADS transceiver 300 receives backscattered laser radiation 303 when laser radiation 301 backscatters from air 302. Transceiver 300 receives backscattered laser radiation 303 through a receiving aperture 309 embedded with barrier 310. Aperture 309 captures and directs backscattered laser radiation 303 to rigidly mounted mirrors 311 (mounted within transceiver 300 by rigid mounting brackets 320) for improved detection. Mirrors 311 may be annular focusing mirrors configured for demagnifying the backscattered laser radiation 303 received through aperture 309. The rigid mounting brackets substantially prevent jitter of backscattered laser radiation 303.

Demagnified laser radiation 312 is reflected towards folding mirrors 313, which, in turn, direct laser radiation 312 to partial reflector 314. Partial reflector 314 reflects a portion of laser radiation 312 in the form of laser radiation 315 towards detector 316. Partial reflector 314 is a beam splitter that reflects a portion (e.g., 50%) of laser radiation 312 and transmits a portion (e.g., 50%) of laser radiation 312.

Detector 316 is similar to detector 154 of FIG. 2. As such, detector 316 converts received laser radiation 315 into an electronic signal, such as electronic signal 155 of FIG. 2, for computer processing. A computer, such as computer 156 of FIG. 2 processes the electronic signal to remove laser power fluctuations caused by atmospheric changes in air 302.

Laser radiation 312 that is directed to vapor filter 317 is filtered by vapor filter 317. In one embodiment, vapor filter 317 is an atomic vapor filter or a mercury vapor filter and electronically controlled by electronics 318. Electronics 318 may control temperature and pressure of the vapor within filter 317 to stabilize or electronically "lock" frequency characteristics of filter 317. Such stabilization makes OADS transceiver 300 less susceptible to vibrational misalignment.

Laser radiation 312 is filtered by filter 317 and passes to detector 319 in the form of filtered laser radiation 321. Detector 319 receives and converts the filtered laser radiation 321 into an electronic signal, which is also processed by the computer to determine the desired air parameters.

Figure 11:
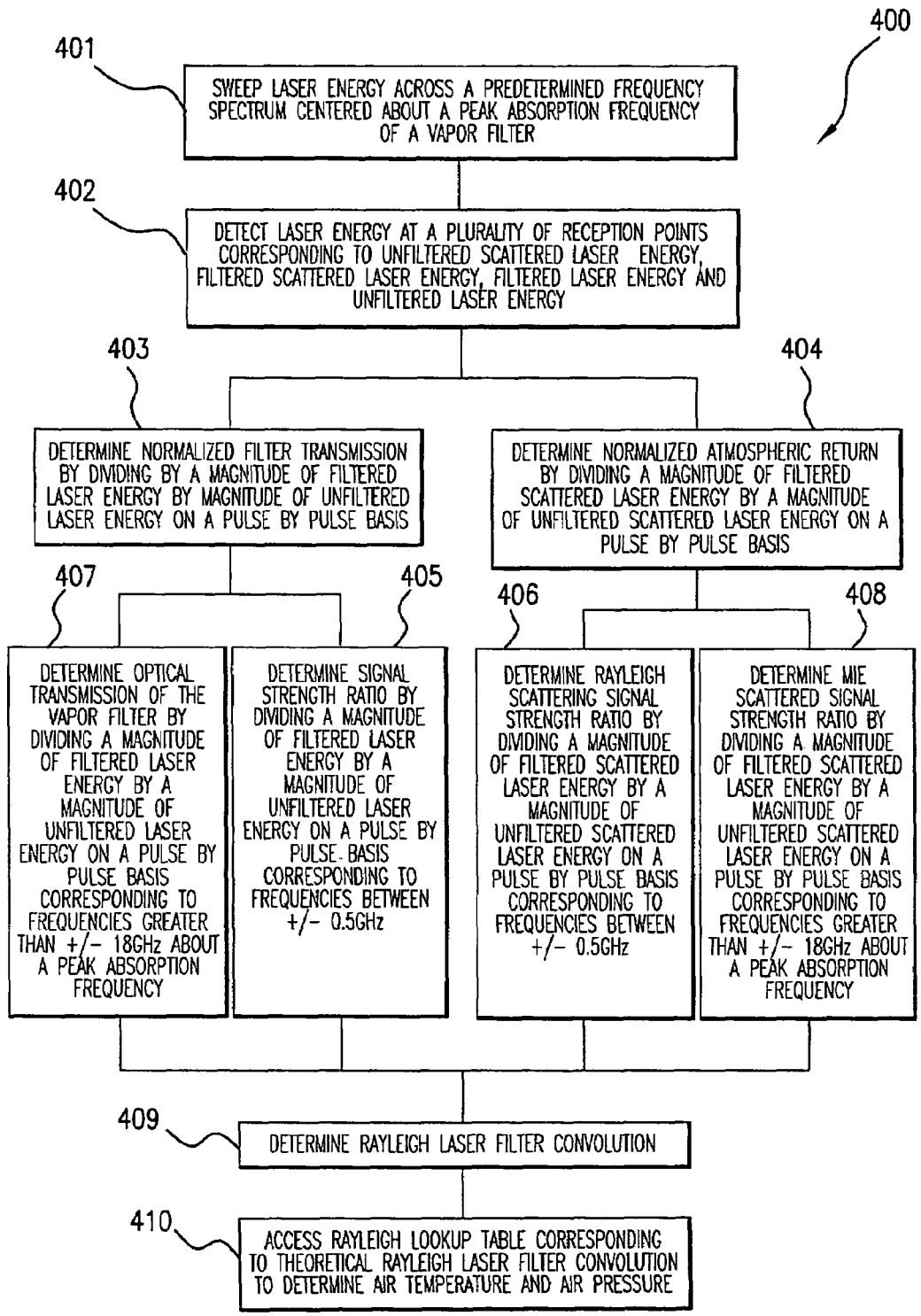
FIG. 11 shows a flowchart of one exemplary methodical operation of an OADS.

FIG. 11 shows a flowchart of one exemplary methodical operation 400 of an OADS. A laser (e.g., laser 141 of FIG. 2) sweeps laser energy across a predetermined frequency spectrum, in element 401. The laser may sweep the laser energy across a frequency range of about +/−20 GHz by firing the laser energy at a certain PRF. In one embodiment, the PRF is about 1 kHz, with a pulse width between about 50 ns and 100 ns, and the swept frequency range is centered about a frequency corresponding to a peak absorption frequency (e.g., 260 nm) of a vapor filter (e.g., vapor filter 152, FIG. 2).

Laser energy is typically split into a four distinct paths such that the laser energy can be detected as four different inputs, in element 402. These four paths of laser energy correspond to: 1) laser energy transmitted by the laser (e.g., component 159 of FIG. 2); 2) laser energy transmitted by the laser through the vapor filter (e.g., component 164 of FIG. 2); 3) laser energy transmitted by the laser into the air and backscattered (e.g., component 150A of FIG. 2); and 4) laser energy transmitted by the laser into the air and backscattered through the vapor filter (e.g., component 157 of FIG. 2). For simplicity, these components are hereinafter referred to as: 1) unfiltered laser energy; 2) filtered laser energy; 3) unfiltered backscattered laser energy; and 4) filtered backscattered laser energy.

After detecting the four forms of laser energy, a computer (e.g., computer 156, FIG. 2), determines normalized filter transmission of the vapor filter, in element 403. For example, the computer in one embodiment processes the unfiltered laser energy and filtered laser energy by dividing the magnitude of the filtered laser energy by the magnitude of the unfiltered laser energy. The division is performed on a pulse by pulse basis, where divided magnitudes of the pulses have corresponding frequencies.

The computer also determines, in one embodiment, normalized atmospheric return of the laser energy, in element 404. For example, the computer processes the unfiltered backscattered laser energy and unfiltered backscattered laser energy by dividing the magnitude of the filtered backscattered laser energy by the magnitude of the unfiltered backscattered laser energy. Again, division is performed on a pulse by pulse basis, where divided magnitudes of the pulses have corresponding frequencies.

Once normalized filter transmission and normalized atmospheric return of the laser energy are determined, the computer determines signal strengths for each of the filter transmission and the atmospheric return. For example, the computer determines the optical transmission through the filter by calculating a ratio of the filtered laser energy to the unfiltered laser energy at particular frequency ranges, in elements 405 and 407. The computer similarly determines the atmospheric return (scattering) signal strength through the filter by calculating a ratio of the filtered backscattered laser energy to the unfiltered laser energy at particular frequency ranges, in elements 406 and 408.

The computer also determines a signal strength ratio for the normalized filter transmission by dividing filtered laser energy by unfiltered laser energy, again on a pulse by pulse basis, at frequencies greater in magnitude than about +/−18 GHz about the peak absorption frequency, in element 407. The computer further determines a signal strength ratio for the normalized filter transmission by dividing filtered laser energy by unfiltered laser energy on a pulse by pulse basis at frequencies between about +/−0.5 GHz, in element 405. These signal strength determinations correspond to frequency ranges where Mie scattering (e.g., +/−18 GHz) and Rayleigh scattering (e.g., +/−0.5 GHz) are most prevalent—useful when combined with similar signal strength determinations for the normalized atmospheric return. The computer determines a Mie scattering signal strength ratio for the normalized atmospheric return of the laser energy by dividing filtered backscattered laser energy by unfiltered backscattered laser energy, again on a pulse by pulse basis, at frequencies greater in magnitude than about +/−18 GHz about the peak absorption frequency, in element 408. The computer also determines a Rayleigh scattering signal strength ratio for the normalized atmospheric return of the laser energy by dividing filtered scattered laser energy by unfiltered backscattered laser energy on a pulse by pulse basis at frequencies between about +/−0.5 GHz in element 406.

With signal optical transmission for the filter and signal strengths for both Rayleigh scattering and Mie scattering determined, the computer determines a Rayleigh laser filter convolution, in element 409. For example, the computer in one embodiment performs a convolution of the optical transmission with the Rayleigh and Mie scattering signal strengths corresponding to the frequency ranges for Rayleigh and Mie scattering of +/−0.5 GHz and +/−18 GHz, respectively. The computer then accesses a lookup table, such as lookup table 170 of FIG. 2, having theoretical Rayleigh laser filter convolution values to determine temperature and pressure of the air, in element 410.

Advantages to the embodiments described above include improved computations of various air parameters, such as air speed, air temperature and air pressure, substantially regardless of altitude and/or Mie scattering. Other advantages include a system that accurately performs in a variety of vibrational environments. Still, other advantages include an ability to determine temperature and pressure within a particular region of atmosphere without a prior knowledge of the atmosphere. Additionally, the instrumentalities as shown and described above advantageously require reduced on-aircraft system calibrations, a more robust system in vibrational environments, and system health checks.

Since certain changes may be made in the above methods and systems without departing from the scope of the invention, one intention is that all matter contained in the above description or shown in the accompanying drawings be interpreted as illustrative and not in a limiting sense. By way of example, those skilled in the art should appreciate that the OADS and the OADS transceivers, as described herein, may be constructed, connected, arranged, and/or combined in other various manners without departing from the scope of the invention. Another intention includes an understanding that the following claims are to cover all generic and specific features of the invention described herein, and all statements of the scope of the invention which, as a matter of language, might be said to fall there between.

What is claimed is:

1. A method for remotely sensing air outside a moving aircraft, comprising:
   generating laser radiation;
   splitting the laser radiation into a projected component and a control component;
   converting the control component into one or more electronic control signals;
   projecting the projected component from the aircraft into the air to induce scattered radiation;
   receiving a portion of the scattered radiation as backscattered radiation;
   converting the backscattered radiation into one or more electronic backscattered radiation signals, including
      splitting the backscattered radiation into a first portion and a second portion,
      converting the first portion to an unfiltered backscattered electronic signal,
      filtering the second portion using an atomic vapor filter to form a filtered second portion, and
      converting the filtered second portion to a filtered backscattered electronic signal; and,
   processing the one or more electronic control signals and the one or more electronic backscattered radiation signals to distinguish a molecular scattered radiation component from an aerosol scattered radiation component, and normalizing atmospheric return, by calculating a ratio of the filtered backscattered electronic signal to the unfiltered backscattered electronic signal, to determine one or more air parameters based on the scattered radiation.

2. The method of claim 1, wherein,
   the step of converting the control component additionally comprises:
      splitting the control component into a first portion and a second portion;
      converting the first portion to an unfiltered electronic control signal;
      filtering the second portion using an atomic vapor filter to form a filtered second portion; and
      converting the filtered second portion to a filtered electronic control signal; and
   the step of processing additionally comprises calculating a ratio of the filtered electronic control signal to the unfiltered electronic control signal.

3. The method of claim 1, wherein the step of processing additionally comprises utilizing at least one of a Least Square Error calculation, a Newton-Rhapson approximation method, and a Monte Carlo approximation method.

4. The method of claim 1, further comprising controlling at least one of a temperature and pressure of vapor within the atomic vapor filter.

5. The method of claim 1, wherein, the step of converting the control component additionally comprises:
   splitting the control component into a first portion and a second portion;
   converting the first portion to an unfiltered electronic control signal;
   filtering the second portion using an atomic vapor filter to form a filtered second portion, and
   converting the filtered second portion to a filtered electronic control signal; and,
   the step of processing additionally comprises calculating a ratio of the filtered electronic control signal to the unfiltered electronic control signal.

6. The method of claim 1, wherein the step of processing additionally comprises utilizing at least one of a Least Square Error calculation, a Newton-Rhapson approximation method, and a Monte Carlo approximation method.

7. A method for remotely sensing air outside a moving aircraft, comprising:
   generating laser radiation;
   splitting the laser radiation into a projected component and a control component;
   converting the control component into one or more electronic control signals including,
      splitting the control component into a first portion and a second portion;
      converting the first portion to an unfiltered electronic control signal;
      filtering the second portion using an atomic vapor filter to form a filtered second portion; and
      converting the filtered second portion to a filtered electronic control signal;
   projecting the projected component from the aircraft into the air to induce scattered radiation;
   receiving a portion of the scattered radiation as backscattered radiation;
   converting the backscattered radiation into one or more electronic backscattered radiation signals; and
   processing the one or more electronic control signals and the one or more electronic backscattered radiation signals by calculating a ratio of the filtered electronic control signal to the unfiltered electronic control signal, to distinguish a molecular scattered radiation component from an aerosol scattered radiation component, and to determine one or more air parameters based on the scattered radiation.

8. The method of claim 7, wherein,
   the step of converting the backscattered radiation additionally comprises:
      splitting the backscattered radiation into a first portion and a second portion;
      converting the first portion to an unfiltered backscattered electronic signal;
      filtering the second portion using an atomic vapor filter to form a filtered second portion; and converting the filtered second portion to a filtered backscattered electronic signal; and, the step of processing additionally comprises normalizing atmospheric return, by calculating a ratio of the filtered backscattered electronic signal to the unfiltered backscattered electronic signal.

9. The method of claim 7, wherein the step of processing additionally comprises utilizing at least one of a Least Square Error calculation, a Newton-Rhapson approximation method, and a Monte Carlo approximation method.

* * * * *